(12) United States Patent
Tatara

(10) Patent No.: US 7,822,422 B2
(45) Date of Patent: Oct. 26, 2010

(54) WIRELESS COMMUNICATION SYSTEM FOR IMPROVED TRANSMISSION PRIORITY CONTROL

(75) Inventor: Nobukazu Tatara, Tokyo (JP)

(73) Assignee: NEC Corporation, Tokyo (JP)

( * ) Notice: Subject to any disclaimer, the term of this patent is extended or adjusted under 35 U.S.C. 154(b) by 795 days.

(21) Appl. No.: 10/878,401

(22) Filed: Jun. 29, 2004

(65) Prior Publication Data

US 2004/0264429 A1    Dec. 30, 2004

(30) Foreign Application Priority Data

Jun. 30, 2003    (JP)    ............................. 2003-186122

(51) Int. Cl.
*H04W 72/00* (2009.01)
*H04B 7/00* (2006.01)
*H04J 1/16* (2006.01)

(52) U.S. Cl. .................... 455/453; 455/41.2; 455/41.3; 370/229

(58) Field of Classification Search ................. 370/338, 370/348, 448, 229, 235, 230; 455/41.2, 512, 455/418, 63.1, 41.3, 453
See application file for complete search history.

(56) References Cited

U.S. PATENT DOCUMENTS

| 6,987,770 | B1 * | 1/2006 | Yonge, III ................... 370/401 |
| 2002/0054574 | A1 * | 5/2002 | Beach et al. ................ 370/279 |
| 2002/0118664 | A1 | 8/2002 | Ishibashi et al. |
| 2003/0117984 | A1 * | 6/2003 | Gavette ....................... 370/338 |
| 2004/0039817 | A1 * | 2/2004 | Lee et al. .................... 709/225 |
| 2004/0095911 | A1 * | 5/2004 | Benveniste et al. .......... 370/338 |
| 2005/0239474 | A9 * | 10/2005 | Liang ......................... 455/454 |

FOREIGN PATENT DOCUMENTS

| JP | 08-154097 | 6/1996 |
| JP | 2000-115842 A | 4/2000 |
| JP | 2001-308866 A | 11/2001 |
| JP | 2001-333094 A | 11/2001 |
| JP | 2002-034062 A | 1/2002 |
| JP | 2002-247042 | 8/2002 |
| JP | 2002-247042 A | 8/2002 |
| JP | 2002-252620 A | 9/2002 |
| JP | 2002-314546 A | 10/2002 |

OTHER PUBLICATIONS

Japan Office Action dated Mar. 24, 2009 in counterpart Japan application, 2 pgs.
D.L. Lough et al., "A Short Tutorial on Wireless LANs and IEEE 802.11," May 10, 1997, pp. 1-5.

* cited by examiner

*Primary Examiner*—Nick Corsaro
*Assistant Examiner*—Shannon R Brooks
(74) *Attorney, Agent, or Firm*—Foley & Lardner LLP

(57) ABSTRACT

A wireless communication system is composed of a client station, and a base station adapted to communicate with the client station through a wireless medium. The client station is designed to defer a transmission of a packet to the base station for a period of time when the wireless medium is busy. The period of time is controlled in response to a communication protocol used for communications between the base station and the client station.

21 Claims, 6 Drawing Sheets

WIRELESS COMMUNICATION SYSTEM FOR IMPROVED TRANSMISSION PRIORITY CONTROL

BACKGROUND OF THE INVENTION

1. Field of the Invention

The present invention is generally related to wireless communication systems and method for the same, more particularly, to wireless communication systems for achieving improved backoff control after network nodes detect collisions on the shared medium.

2. Description of the Related Art

The IEEE 802.11 specification is one of the recommended international standards for WLANs (Wireless Local Area Network). The specification contains technical details for the Medium Access Control (MAC) layer and the Physical (PHY) layer of the communication protocol.

Priority control of communications over the IEEE 802.11 WLANs is one of the issues. Japanese Open Laid Patent Application No. 2002-314546A, and its corresponding U.S. patent application No. US2002/0159418 A1 disclose a priority control method for WLANs, which entitles stations requesting high QoSs (quality of service) to enter a prioritized poling list, and thereby provides improved QoS control.

Japanese Open Laid Patent Application No. P2002-252620 discloses another priority control method for WLANs, which provides each mobile station with a list in which available access points are listed with order of priority, and thereby achieves optimized access point selection. Japanese Open Laid Patent Application No. P2001-308866A discloses similar priority control method for WLANs, which is based on the access point list; the access point selection in this priority control method is additionally responsive to the electric field strengths of the responses received from the access points.

Japanese Open Laid Patent Application No. 2000-115842 discloses a priority control method for digital codeless phone system for selecting trunk interfaces. In this system, mobile stations are grouped into a plurality of groups, and preferred trunk interfaces are defined for each group. The trunk interface associated with the group to which a specific mobile station interfaces incoming and outgoing calls for the specific mobile station.

Due to an increased need for providing IP (internet protocol) phone services, including video phone services, recent requirements for WLANs include transmission of real-time audio and video data; however, the communication protocol currently defined in the IEEE 802.11, which is based on the CSMA/CA (carrier sense multiple access with collision avoidance) protocol, suffers from delay in transmission of real-time data. This mainly results from the fact that the backoff control after collision detection currently defined in the IEEE 802.11 specification is not suitable for transmission of real-time data.

Therefore, there is a need for providing an improved backoff control for wireless communication systems, especially for WLANs.

SUMMARY OF THE INVENTION

The present invention generally addresses providing an improved backoff control for wireless communication systems.

Specifically, an object of the present invention is to provide a system and method suitable for real-time data transmission over wireless communication networks, especially suitable for WLANs.

In an aspect of the present invention, a wireless communication system is composed of a client station, and a base station adapted to communicate with the client station through a wireless medium. The client station is designed to defer a transmission of a packet to the base station for a period of time when the wireless medium is busy. The period of time is controlled in response to a communication protocol used for communications between the base station and the client station.

Preferably, the base station is designed to select the communication protocol used for the communications between the base station and the client station, out of a plurality of predetermined communication protocols, and to generate control information used for control of the period of time in response to the selected communication protocol. In this case, the client station is configured to control the period of time in response to the control information.

In preferred embodiment, the client station generates a protocol request indicative of a desired protocol which the client station desires to use for the communications between the base station and the client station, and the base station is responsive to the protocol request for selecting the communication protocol.

The base station may contain configuration information describing an association of the plurality of predetermined communication protocols with control information to be generated. In this case, the base station refers to the configuration information to generate the control information.

When the wireless communication system further includes a management system, the management system preferably provides the base station with the configuration information.

The wireless communication system may include a plurality of base stations. In this case, the management system preferably controls the plurality of base stations.

The period of time for which the client station defers the transmission to the base station when the medium is busy is preferably controlled so that the period of time in the case that the real-time transport protocol (RTP) is used for the communications between the base station and the client station is averagely shorter than that in the case that the Post Office Protocol version 3 (POP3) is used for the communications between the base station and the client station.

Furthermore, the period of time is preferably controlled so that the period of time in the case that the real-time transport protocol (RTP) is used for the communications between the base station and the client station is averagely shorter than that in the case that the File Transfer Protocol (FTP) is used for the communications.

In another aspect of the present invention, a wireless communication system is composed of a client station, a base station adapted to communicate with the client station through a medium in accordance with the IEEE 802.11 specification. The client station is designed to determine whether the medium is busy when desiring to transmit a packet, to defer a transmission of a packet when detecting that the medium is busy, and to wait for a backoff time period selected from a contention window to transmit the packet through the medium after detecting that the medium has been free for a DIFS. The contention window is controlled in response to a communication protocol used for communications between the base station and the client station.

Preferably, the base station is designed to select the communication protocol used for the communications between the base station and the client station, out of a plurality of predetermined communication protocols, to select the contention window in response to the selected communication protocol, and to inform the client station of the selected contention window.

Preferably, the client station provides a protocol request to the base station, and the base station selects the communication protocol in response to the protocol request. In this time, the client station preferably generates an association request frame including the protocol request, when joining a BSS associated with the base station. It is also preferable that the base station returns an association response frame to the client station in response to the association request frame so that the association response frame contains the contention window selected by the base station.

The base station may contain contention window configuration information describing an association of the predetermined communication protocols with allowed contention window ranges. In this case, the base station preferably selects the contention window from one of the allowed contention window ranges associated with the selected communication protocol.

The contention window is controlled so that the contention window in the case that the real-time transport protocol (RTP) is used for the communications between the base station and the client station is averagely shorter than that in the case that the Post Office Protocol version 3 (POP3) is used for the communications between the base station and the client station.

Furthermore, the contention window is controlled so that the contention window in the case that the real-time transport protocol (RTP) is used for the communications between the base station and the client station is averagely shorter than that in the case that the File Transfer Protocol (FTP) is used for the communications between the base station and the client station.

DESCRIPTION OF THE PREFERRED EMBODIMENTS

Preferred embodiments of the present invention are described below in detail with reference to the attached drawings.

System Structure

Figure 1:
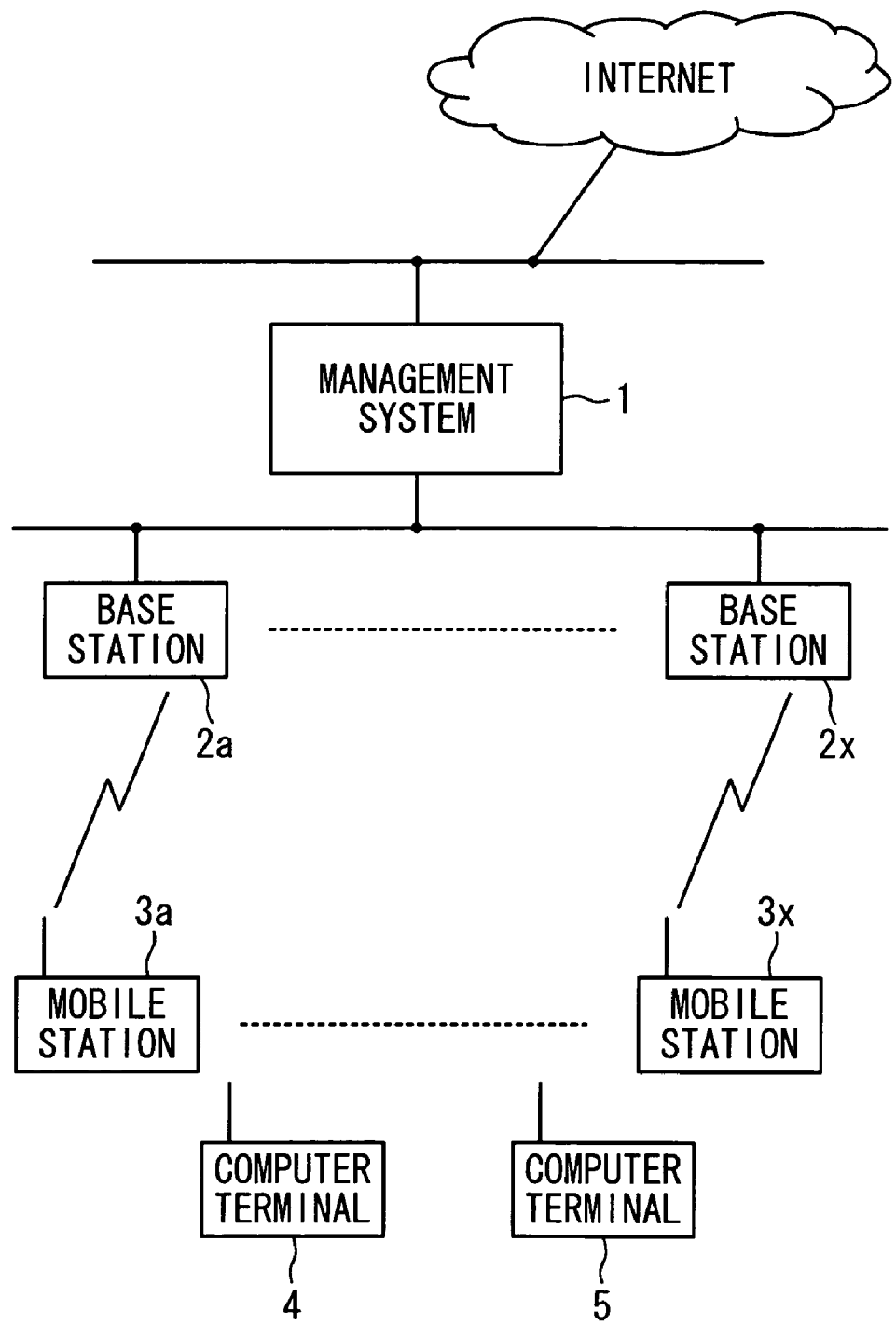
FIG. 1 is a block diagram of an IEEE 802.11 WLAN system in one embodiment of the present invention.

In one embodiment, as shown in FIG. 1, an IEEE 802.11 WLAN system is composed of a management system 1, a plurality of base stations 2, and a plurality of client stations 3, 4, and 5; the base stations 2 may be distinguished each other by numerals 2a through 2x, and the client stations 3 by numerals 3a through 3x. The management system 1 is communicably connected to the base stations 2 through a local area network, and the base stations 2 are wirelessly connected to the client stations 3, 4, and 5.

The management system 1 is used for controlling the base stations 2. The management system 1 configures the respective base stations 2 for IEEE 802.11-based communications.

The base stations 2 are adapted to accommodate the client stations 3, 4, and 5. The communications between the base stations 2 and the client stations 3, 4, and 5 are in accordance with the IEEE 802.11 specification. The client stations 3, 4, and 5 may include WLAN mobile stations, designated by numerals 3a through 3x, and computer terminals installed with WLAN cards, designated by numerals 4 and 5.

In order to reduce collisions on the medium shared by the client stations 3, 4, and 5, the client stations 3, 4, and 5 are configured to perform the collision control defined in the IEEE 802.11 specification; a client station willing to transmit a packet senses the medium. If the medium is clear for a DIFS (Distributed Inter Frame Spacing), then the client station transmits the packet. If not so, the client station waits for a backoff time period before transmitting the packet after the medium has been clear for a DIFS. The backoff time period is uniformly selected between 0 and the contention window (CW). As described below, the present invention addresses an improved control of the backoff time period.

Priority Control in WLAN

In this embodiment, IP mobile phone services are provided for the mobile stations $3a$ through $3x$. This requires transmissions of real-time data, including audio or video data, between the mobile stations $3a$ through $3x$ and the base stations 2. Therefore, the mobile stations $3a$ through $3x$ is allowed to use the Real-time Transport Protocol (RTP) on top of the IEEE 802.11 protocol.

In contrast, the computer terminals 4 and 5 are not adapted to the IP mobile phone services. The computer terminals 4, and 5 are allowed to use POP3 (Post Office Protocol version 3) and FTP (File Transfer Protocol) for data communications with the base stations 2.

It is advantageous that the mobile stations $3a$ through $3x$, which performs real-time data transmissions, are given priority over the computer terminals 4, and 5 when the mobile stations $3a$ through $3x$ and the computer terminals 4, and 5 experiences collisions on the shared medium.

In this embodiment, such priority control is achieved through an improved backoff algorithm which controls backoff time periods in response to upper layer protocols run on top of the IEEE 802.11 protocol for achieving communications between the client stations 3 to 5 and base stations 2.

Specifically, the backoff algorithm in this embodiment configures the client stations 3, 4, 5 with contention windows in response to the upper layer protocols so that the mobile stations $3a$ through $3x$, which use RTP for communications with the base stations 2, are configured with reduced contention windows. This results in that the mobile stations $3a$ through $3x$ deter transmissions for relatively reduced backoff time periods when detecting collisions. In contrast, the computer terminals 4, and 5, are configured with increased contention windows, and thus defer transmissions for relatively increased backoff time periods.

This results in that the mobile stations $3a$ through $3x$, which use RTP for real-time data transmissions, preferentially transmit packets when collisions occur on the shared medium, and thereby effectively reduces the delay in the real-time data transmissions.

Figure 3:
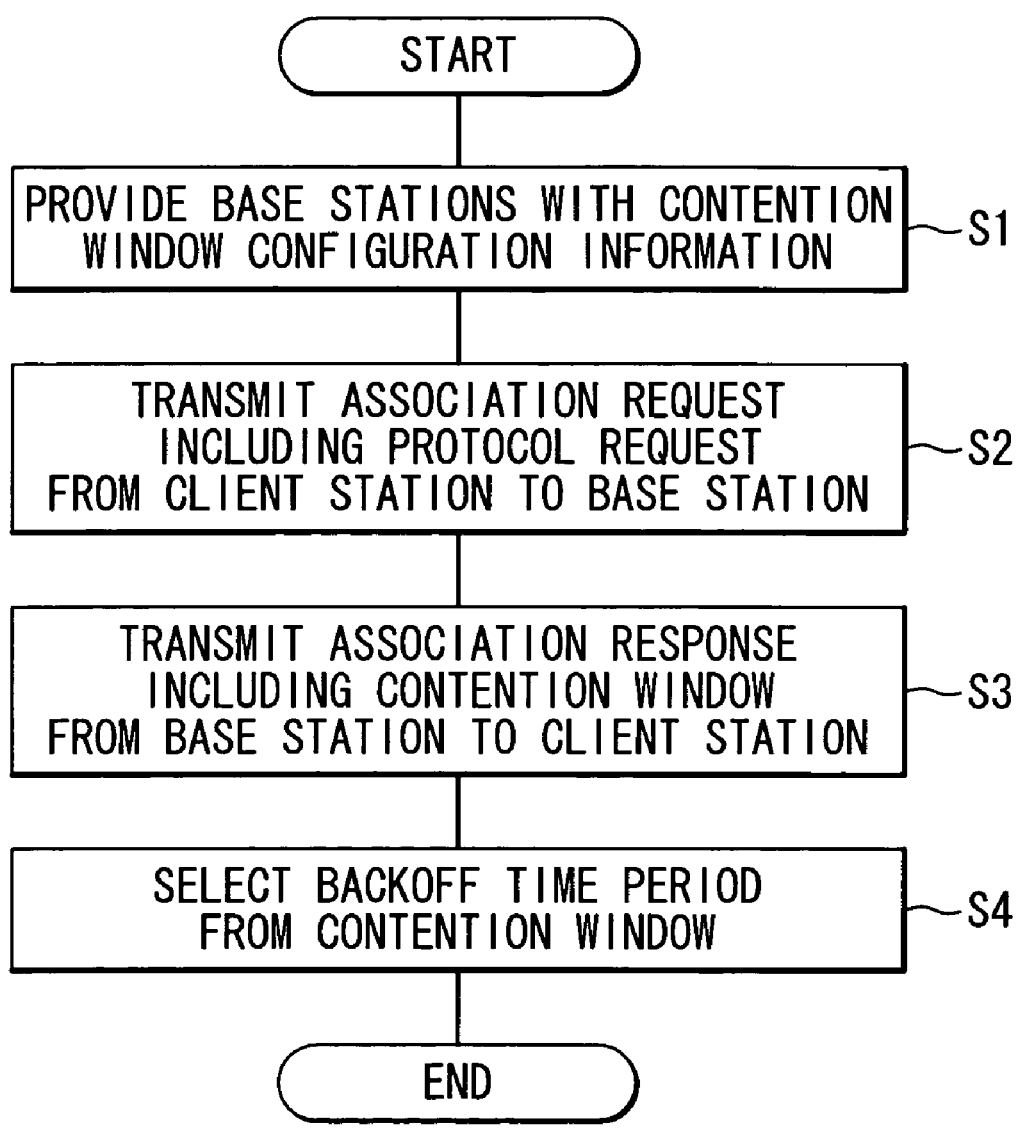
FIG. 3 is a flowchart illustrating an operation procedure of the WLAN system in this embodiment.
Figure 4:
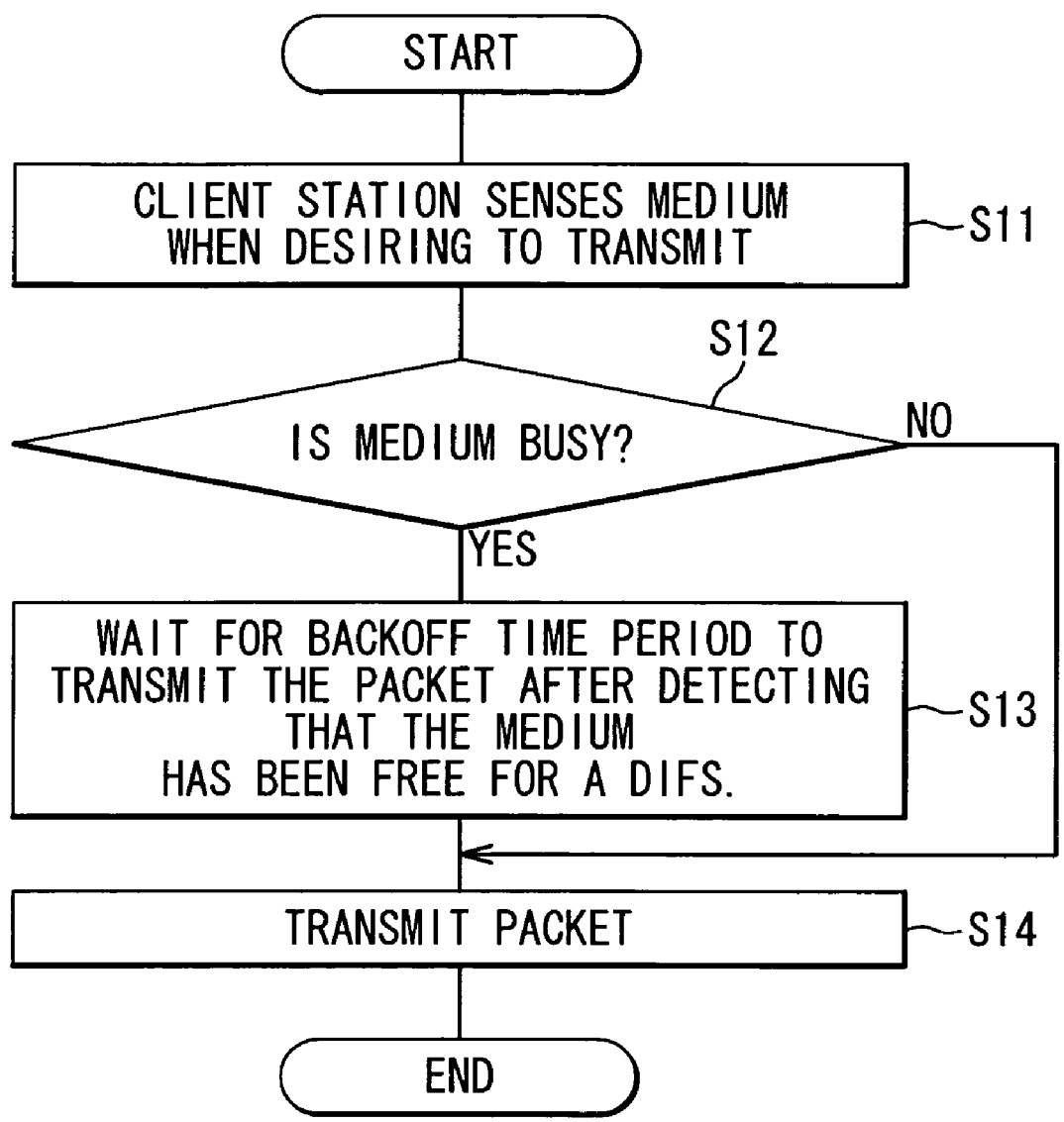
FIG. 4 is a flowchart illustrating an operation procedure of the WLAN system when client stations detect collisions on the shared medium.

The following is a detailed description of the operation of the IEEE 802.11 WLAN system in this embodiment. FIG. 3 is a flowchart illustrating an exemplary operation procedure in this embodiment.

At Step S01, the management system 1 provides the respective base stations 2 with contention window configuration information, which is referred to as the CW configuration information, hereinafter. The base stations 2 uses the contention window configuration information for configuring the client stations 3 to 5 with the contention windows.

Figure 2:
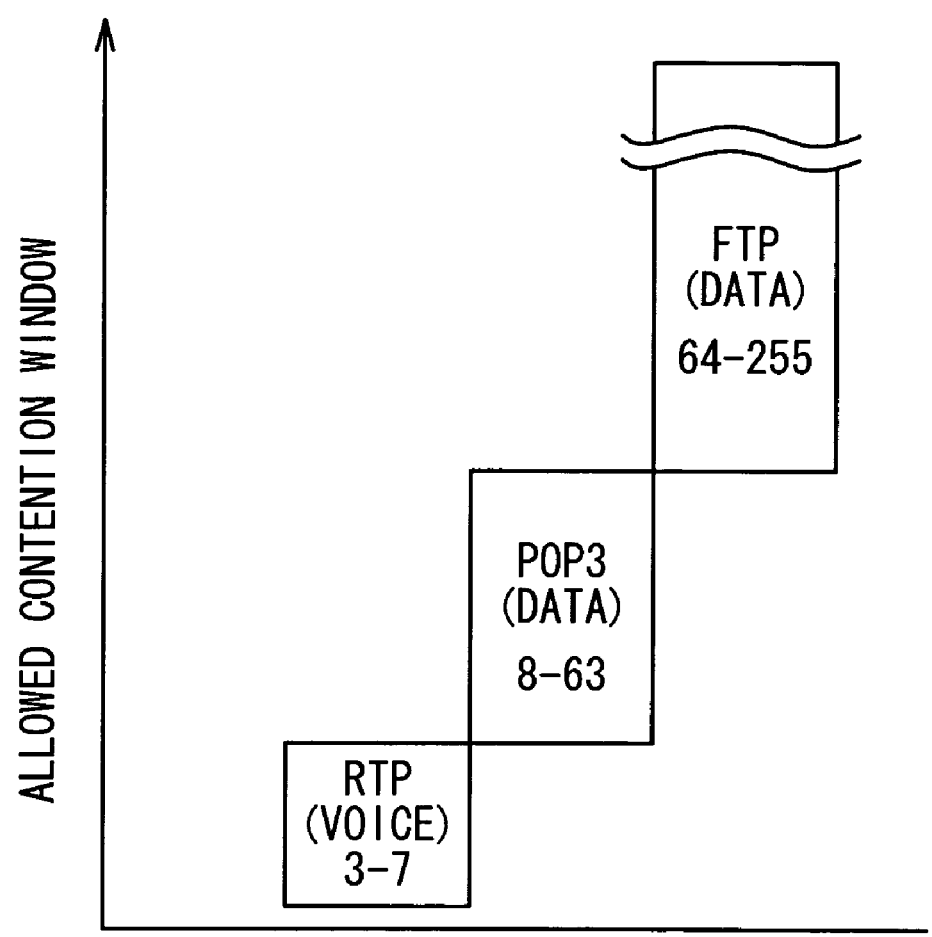
FIG. 2 is a schematic diagram illustrating contents of contention window (CW) configuration information provided for base stations.

FIG. 2 illustrates contents of the CW configuration information. The CW configuration information describes an association of upper layer protocols with allowed contention windows defined by maximum contention windows ($CW_{max}$) and minimum contention windows ($Cw_{min}$). In this embodiment, for example, the RTP is associated with a minimum contention window of three and a maximum contention window of seven; this implies that a client station using the RTP is configured with a contention window between three and seven. The same goes for the POP3 and the FTP.

Referring back to FIG. 3, at Step S02, the client stations 3 to 5 send association request frames to the base stations 2, as defined in the IEEE 802.11 specification, when joining existing BSSs (basic service set) controlled by the base stations 2. The association request frames include protocol requests for informing the base stations 2 of the upper layer protocols the client stations 3 to 5 desire to use. In this embodiment, the mobile stations 3a through 3x issue protocol requests for requesting the use of the RTP, while the computer terminals 4 and 5 issue protocol requests for requesting the use of the POP3, and the FTP, respectively.

In response to the protocol requests within the association request frames, at Step S03, the base stations 2 select the upper layer protocols used for communications with the client stations 3 to 5, and then select contention windows to be configured with the client stations 3 to 5 in response to the selected upper layer protocols on the basis of the CW configuration information.

The contention windows are selected from the allowed contention windows associated with the upper layer protocols used for communications between the base stations 2 and the client stations 3 to 5. For example, the contention windows for the mobile stations 3a through 3x, which uses the RTP, are selected from the allowed contention window associated with the RTP. Correspondingly, the contention windows for the computer terminals 4 and 5, which use the POP3, and the FTP, are selected from the allowed contention windows associated with the POP3 and FTP, respectively.

The base stations 2 send association response frames to the client stations 3 to 5, and thereby inform the client stations 3 to 5 of the selected upper layer protocols and contention windows; the association response frames are used for controlling the backoff time periods.

In response to the association response frames, at Step S04, the client stations 3 to 5 are configured to communicate with the base stations 2 using the selected upper layer protocols, and also configured with the selected contention windows for selecting backoff time periods. This results in that the mobile stations 3a through 3x are configured with relatively reduced contention windows, while the computer terminals 4 and 5 are configured with relatively increased contention windows.

Transmissions of data packets from the client stations 3 to 5 to the base stations 2 are performed as follows. When one of the client stations 3 to 5 desires to transmit a data packet to a specific one of the base stations 2 (referred to as the destination base station, hereinafter), the desiring client station senses the medium at Step S11.

If the medium is sensed free for a DIFS, as designated by symbol "N" at Step S12, the desiring client station transmits the data packet to the destination base station at Step S14.

Otherwise, as designated by symbol "Y" at Step S12, the desiring client station defers the transmission of the data packet at Step S13. The desiring client station goes on sensing the medium. After the medium has been free for a DIFS, the desiring client station further waits for a backoff time period before transmitting the data packet, the backoff time period being randomly selected between 0 and the associated contention window. After the backoff time period expires without the medium sensed busy, the desiring client station transmits the data packet to the destination base station at Step S14.

This procedure allows the mobile stations 3a through 3x to defer transmissions for relatively reduced backoff time periods, while allowing the computer terminals 4, and 5 to defer transmissions for relatively increased backoff time period, because the mobile stations 3a through 3x are configured with relatively reduced contention windows compared to the computer terminals 4, and 5. The backoff time periods defined for the mobile stations 3a through 3x are averagely shorter than those for the computer terminals 4, and 5. This effectively provides transmission priorities for the mobile stations 3a through 3x, which performs real-time data transmissions, over the computer terminals 4 and 5, when collisions are detected on the medium, and thereby effectively reduces the undesirable delay in transmitting real-time data for the IP mobile phone services.

The fact that the management system 1 manages the base stations 2a through 2x is useful for controlling roaming. This eliminates a need for performing an association process when roaming occurs, because the management system 1, which manages all the base stations 2a through 2x, can recognize that a specific mobile station 3 moves from one BSS to another. Additionally, this architecture advantageously eliminates a need for reconfiguring the roaming mobile station 3 with the contention window.

Operation Example

Figure 5:
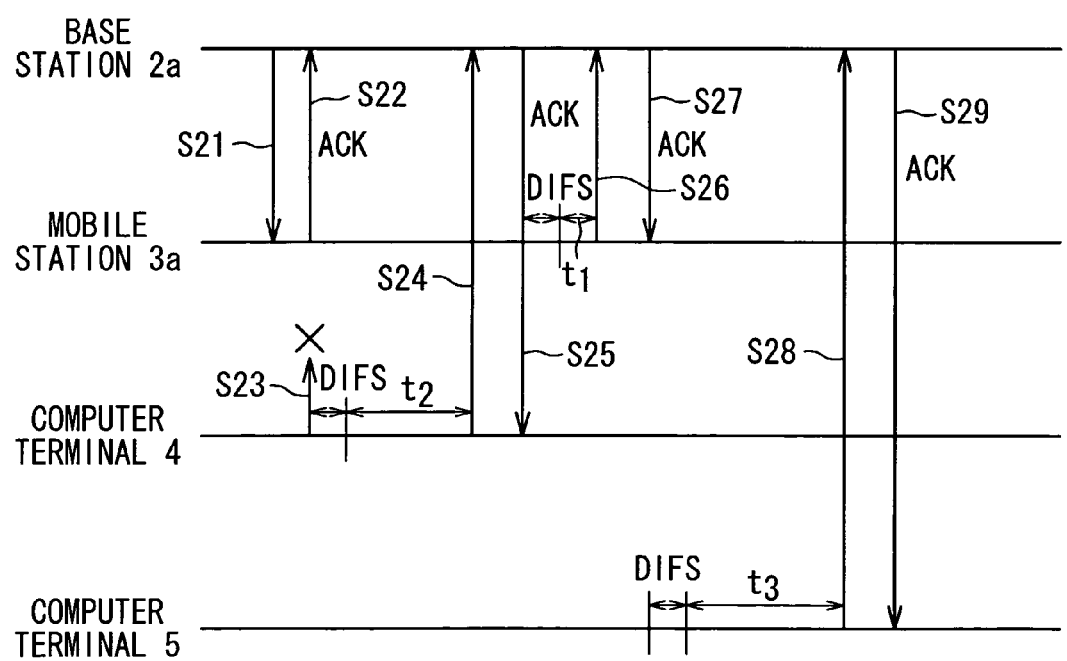
FIG. 5 is a timing diagram illustrating an example of the operation procedure of the WLAN system.

FIG. 5 illustrates an example of the system operation procedure in this embodiment. The mobile station 3a, the computer terminals 4 and 5 are involved in this example.

At Step 21, the base station 2a transmits a data packet to the mobile station 3a. Upon receiving the data packet, at Step S22, the mobile station 3a returns an ACK (acknowledgment) packet to the base station 2a.

During the exchanges of the data and ACK packets between the base station 2a and the mobile station 3a, the computer terminal 4 tries to transmit a data packet to the base station 2a using POP3 at Step S23. The computer terminal 4 senses the medium associated with the base station 2a before transmitting the data packet. This results in that the computer terminal 4 senses the medium busy, and defers the transmission.

The computer terminal 4 goes on sensing the medium, and waits till sensing that the medium has been free for a DIFS. After sensing the medium has been free for a DIFS, the computer terminal 4 further waits for a backoff time period selected from the associated contention window, the selected backoff time period being designated by the symbol $t_2$ in FIG. 5. For the computer terminal 4, which uses the POP3 for communications with the base station 2a, the backoff time period $t_2$ is selected as being relatively long.

After the relatively long backoff time period $t_2$ expires, at Step S24, the computer terminal 4 transmits the data packet to the base station 2a. Upon receiving the data packet, at Step S25, the base station 2a returns an ACK packet to the computer terminal 4.

During the exchanges of the data and ACK packets between the base station 2a and the computer terminal 4, the mobile stations 3a tries to transmit a data packet to the base station 2a using RTP; the mobile stations 3a senses the medium associated with the base station 2a before transmitting the data packet. This results in that the mobile stations 3a senses the medium busy, and defers the transmission.

In the same way as the transaction between the base station 2 and the computer terminal 4, the mobile stations 3a waits for a backoff time period selected from the associated contention window after the medium has been free for a DIFS, and then transmits the data packet to the base station 2a at Step S26; the backoff time period selected by the mobile stations 3a is designated by the symbol $t_1$ in FIG. 5. In average, the selected backoff time period $t_1$ is shorter than the backoff time period $t_2$, which is selected by the computer terminal 4. Upon receiving the data packet, the base station 2a returns an ACK packet to the mobile stations 3a at Step 27.

During the exchanges of the data and ACK packets between the base station 2a and the mobile stations 3a, the computer terminal 5 tries to transmit a data packet to the base station 2a using FTP; the computer terminal 5 senses the medium associated with the base station 2a before transmitting the data packet. This results in that the computer terminal 5 senses the medium busy, and defers the transmission.

In the same way as the transaction between the base station 2 and the mobile stations 3a, the computer terminal 5 waits for a backoff time period selected from the associated contention window after the medium has been free for a DIFS, and then transmits the data packet to the base station 2a at Step S28; the backoff time period selected by the computer terminal 5 is designated by the symbol $t_3$ in FIG. 5. In average, the selected backoff time period $t_3$ is longer than the backoff time periods $t_1$ and $t_2$, which are selected by the mobile station 3a an the computer terminal 4, respectively. Upon receiving the data packet, the base station 2a returns an ACK packet to the mobile stations 3a at Step S29.

In another example, the mobile stations 3a and the computer terminals 4 and 5 try to transmit data packets to the base station 2a at the same time. This causes a collision on the shared medium; however, the data packet from the mobile stations 3a is preferentially transmitted to the base station 2 over those from the computer terminals 4 and 5 due to its relatively reduced backoff time period. This effectively reduces the delay in the transmissions real-time data from the mobile stations 3a to the base station 2a, and provides an improved IP mobile phone service for the mobile stations 3a.

Figure 6:
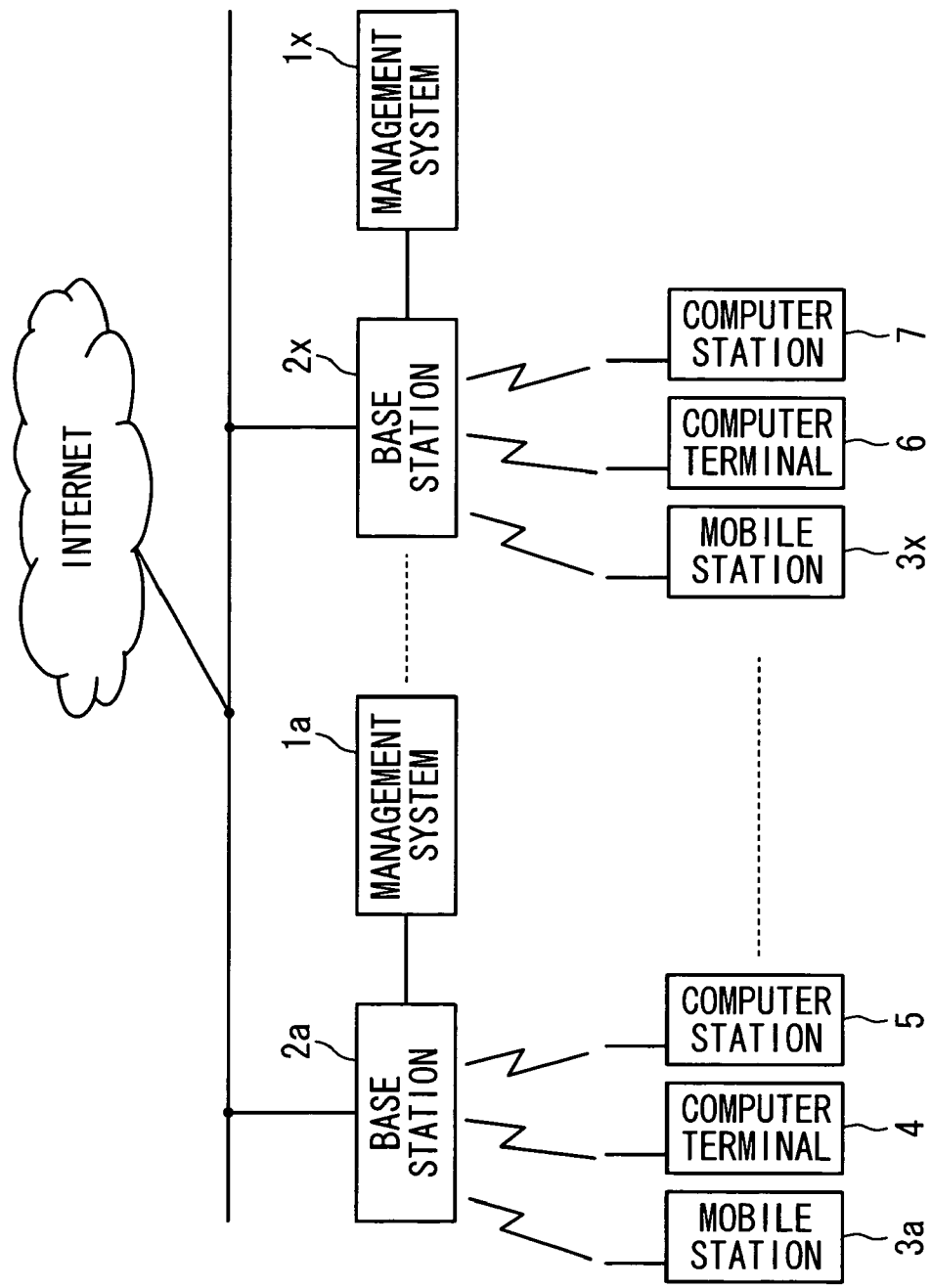
FIG. 6 is a block diagram illustrating an IEEE 802.11 WLAN system in another embodiment of the present invention.

In an alternative embodiment, as shown in FIG. 6, a plurality of management systems 1a through 1x may be respectively connected to the base stations 2a through 2x in place of the single management system 1. The management systems 1a through 1x manage the base stations 2a through 2x, respectively. Each of the management systems 1a through 1x provides the aforementioned CW configuration information with the associated base station; the management system 1a provides the base station 2a connected thereto with the CW configuration information used for preparing contention windows for the client stations 3a, 4, and 5 joining the BSS associated with the base station 2a. Correspondingly, the management system 1x provides the base station 2x connected thereto with the CW configuration information used for preparing contention windows for the client stations 3x, 6, and 7 joining the BSS associated with the base station 2x.

Although the invention has been described in its preferred form with a certain degree of particularity, it is understood that the present disclosure of the preferred form has been changed in the details of construction and the combination and arrangement of parts may be resorted to without departing from the scope of the invention as hereinafter claimed.

What is claimed is:

1. A wireless communication system comprising:
   a client station; and
   at least one base station adapted to communicate with said client station through a wireless medium,
   wherein said client station is designed to defer a transmission of a packet to said base station until a back off time period expires when said wireless medium is busy,
   said backoff time being selected from a contention window, and
   wherein said base station is configured to select a communication protocol used for communications between said base station and said client station out of a plurality of predetermined communication protocols, and
   wherein said base station is configured to select said contention window from allowed contention windows which are respectively associated with said plurality of predetermined communication protocols in response to said selected communication protocol used for communications between said base station and said client station.

2. The wireless communication system according to claim 1, wherein said base station selects said communication protocol used for said communications between said base station and said client station, out of said plurality of predetermined communication protocols,
   wherein said base station generates control information used for control of said contention window in response to said selected communication protocol, and
   wherein said client station controls said contention window in response to said control information.

3. The wireless communication system according to claim 2, wherein said client station generates a protocol request indicative of a desired protocol which said client station desires to use for said communications between said base station and said client station, and
   wherein said base station is responsive to said protocol request for selecting said communication protocol.

4. The wireless communication system according to claim 1, wherein said base station contains configuration information describing an association of said plurality of predetermined communication protocols with control information to be generated, and
   wherein said base station refers to said configuration information to generate said control information.

5. The wireless communication system according to claim 1, further comprising:
   a management system controlling said at least one base station, wherein said management system provides said base station with said configuration information.

6. The wireless communication system according to claim 1, wherein said at least one base station includes a plurality of base stations, and
   wherein said management system controls said plurality of base stations.

7. The wireless communication system according to claim 1, wherein said contention window is controlled so that said backoff time in the case that the real-time transport protocol (RTP) is used for said communications between said base station and said client station is averagely shorter than that in the case that the Post Office Protocol version 3 (POP3) is used for said communications between said base station and said client station.

8. The wireless communication system according to claim 1, wherein said contention window is controlled so that said backoff time in the case that the real-time transport protocol (RTP) is used for said communications between said base station and said client station is averagely shorter than that in the case that the File Transfer Protocol (FTP) is used for said communications.

9. A wireless communication system comprising:
a client station; and
a base station adapted to communicate with said client station through a medium in accordance with the IEEE 802.11 specification,
wherein said client station is designed to determine whether said medium is busy when desiring to transmit a packet, to defer a transmission of a packet when detecting that said medium is busy, and to wait for a backoff time period selected from a contention window to transmit said packet through said medium after detecting that said medium has been free for a DIFS (distributed inter frame space), and
wherein said based station is configured to select a communication protocol used for communications between said base station and said client station out of a plurality of predetermined communication protocols, and
wherein said based station is configured to select the contention window from allowed contention windows which are respectively associated with said plurality of predetermined communication protocols in response to said selected communication protocol used for communications between said base station and said client station.

10. The wireless communication system according to claim 9, wherein said base station selects said communication protocol used for said communications between said base station and said client station, out of said plurality of predetermined communication protocols,
wherein said base station selects said contention window in response to said selected communication protocol, and informs said client station of said selected contention window.

11. The wireless communication system according to claim 10, wherein said client station provides a protocol request to said base station, and
wherein said base station selects said communication protocol in response to said protocol request.

12. The wireless communication system according to claim 11, wherein said client station generates an association request frame including said protocol request, when joining a BSS associated with said base station.

13. The wireless communication system according to claim 12, wherein said base station returns an association response frame to said client station in response to said association request frame, and
wherein said association response frame contains said contention window selected by said base station.

14. The wireless communication system according to claim 10, wherein said base station contains contention window configuration information describing an association of said predetermined communication protocols with said allowed contention windows, and
wherein said base station selects said contention window from one of said allowed contention window ranges associated with said selected communication protocol.

15. The wireless communication system according to claim 9, wherein said contention window is controlled so that said backoff time in the case that the real-time transport protocol (RTP) is used for said communications between said base station and said client station is averagely shorter than that in the case that the Post Office Protocol version 3 (POP3) is used for said communications between said base station and said client station.

16. The wireless communication system according to claim 9, wherein said contention window is controlled so that said backoff time in the case that the real-time transport protocol (RTP) is used for said communications between said base station and said client station is averagely shorter than that in the case that the File Transfer Protocol (FTP) is used for said communications between said base station and said client station.

17. A base station adapted to communicate with a client station within a wireless communication system, comprising:
means for selecting a communication protocol used for communications between said base station and said client station from a plurality of predetermined communication protocols;
means for generating control information used for controlling a contention window used to determine a back off time for which said client station defers a transmission of a packet to said base station until said back off time expires when a medium allowing access to said base station is busy; and
means for transmitting said control information to said client station,
wherein said contention window is selected from allowed contention windows which are respectively associated with said plurality of predetermined communication protocols in response to said selected communication protocol.

18. A method of operating a wireless communication system including a base station and a client station, comprising:
selecting a communication protocol used for communications between said base station and said client station from a plurality of predetermined communication protocols,
said client station deferring a transmission of a packet to said base station until a back off time expires when a medium allowing access to said base station is busy, said back off time being selected from a contention window; and
selecting said contention window from allowed contention windows which are respectively associated with said plurality of predetermined communication protocols in response to said selected communication protocol used for communications between said base station and said client station.

19. The method of operating a wireless communication system including a base station and a client station according to claim 18, further comprising:
said base station selecting said communication protocol used for said communications between said base station and said client station, out of said plurality of predetermined communication protocols;
said base station generating control information used for control of said contention window in response to said selected communication protocol; and
said client station controlling said contention window in response to said control information.

20. The method of operating a wireless communication system according to claim 19, further comprising:

providing said base station with configuration information describing an association of said plurality of predetermined communication protocols with control information to be generated, wherein said control information is generated through referring to said configuration information.

21. A method for operating a wireless communication system including a client station and a base station adapted to communicate with said client station through a medium in accordance with the IEEE 802.11 specification, said method comprising:

selecting a communication protocol used for communications between said base station and said client station from a plurality of predetermined communication protocols, selecting a contention window from allowed contention windows which are respectively associated with said plurality of predetermined communication protocols in response to said selected communication protocol, configuring said client station with said contention window;

said client station sensing said medium when desiring to transmit a packet;

said client station deferring a transmission of a packet when detecting that said medium is busy; and said client station waiting for a backoff time selected from said contention window to transmit said packet through said medium after detecting that said medium has been free for a DIFS (distributed inter frame space).

\* \* \* \* \*